(12) United States Patent
Flynn, IV et al.

(10) Patent No.: US 11,765,586 B2
(45) Date of Patent: Sep. 19, 2023

(54) CONTEXT AWARE AUTHORIZATION FOR DATA AND SERVICES IN THE IOT/M2M SERVICE LAYER

(71) Applicant: CONVIDA WIRELESS, LLC, Wilmington, DE (US)

(72) Inventors: William Robert Flynn, IV, Schwenksville, PA (US); Dale N. Seed, Allentown, PA (US); Zhuo Chen, Claymont, DE (US); Quang Ly, North Wales, PA (US); Catalina Mihaela Mladin, Hatboro, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 196 days.

(21) Appl. No.: 16/771,728

(22) PCT Filed: Dec. 18, 2018

(86) PCT No.: PCT/US2018/066254
§ 371 (c)(1),
(2) Date: Jun. 11, 2020

(87) PCT Pub. No.: WO2019/126185
PCT Pub. Date: Jun. 27, 2019

(65) Prior Publication Data
US 2021/0176637 A1    Jun. 10, 2021

Related U.S. Application Data

(60) Provisional application No. 62/607,006, filed on Dec. 18, 2017.

(51) Int. Cl.
*H04L 29/06* (2006.01)
*H04W 12/08* (2021.01)
(Continued)

(52) U.S. Cl.
CPC ............. *H04W 12/08* (2013.01); *H04W 4/70* (2018.02); *H04W 12/37* (2021.01); *H04W 12/60* (2021.01)

(58) Field of Classification Search
CPC ....... H04W 12/08; H04W 4/70; H04W 12/37; H04W 12/60; H04L 67/12
See application file for complete search history.

(56) References Cited

U.S. PATENT DOCUMENTS

2007/0113079 A1 * 5/2007 Ito ........................... G06F 9/468
                                                        713/166
2008/0229100 A1 * 9/2008 Trodden .................. G06F 21/10
                                                        713/161
(Continued)

FOREIGN PATENT DOCUMENTS

CN      101616416 A  * 12/2009
JP      2016-534437 A   11/2016
(Continued)

OTHER PUBLICATIONS

OneM2M, oneM2M Functional Architecture, TS-0001 V-3.6.0, Jun. 1, 2017.

*Primary Examiner* — Shawnchoy Rahman
(74) *Attorney, Agent, or Firm* — BakerHostetler

(57) ABSTRACT

An Authorization Verification Service (AVS) is disclosed that may be provided by an IoT/M2M service layer to registrants of the service layer for Dynamic Context Aware Authorization. The AVS may allow the IoT/M2M service layer entities to define dynamic limits for authorizing access to services or data. The limits may be set, for example, in terms of the number of allowed accesses. When an IoT/M2M registrant makes a request for data or services for which it has dynamic context aware authorization, the AVS may maintain records of the remaining accesses available.

20 Claims, 15 Drawing Sheets

(51) Int. Cl.
*H04W 4/70* (2018.01)
*H04W 12/37* (2021.01)
*H04W 12/60* (2021.01)

(56) References Cited

U.S. PATENT DOCUMENTS

| | | | | |
|---|---|---|---|---|
| 2010/0156591 | A1* | 6/2010 | Newman | G08B 13/2491 340/5.82 |
| 2010/0330976 | A1* | 12/2010 | Berna Fornies | H04L 67/025 455/419 |
| 2014/0165155 | A1 | 6/2014 | Zhang | |
| 2015/0031335 | A1* | 1/2015 | Dong | H04L 63/20 455/411 |
| 2016/0344841 | A1* | 11/2016 | Wang | H04W 4/025 |
| 2017/0063931 | A1 | 3/2017 | Seed et al. | |
| 2019/0182215 | A1 | 6/2019 | Dong et al. | |
| 2019/0253994 | A1 | 8/2019 | Dong et al. | |

FOREIGN PATENT DOCUMENTS

| | | | | |
|---|---|---|---|---|
| JP | 2018-529161 | A | 10/2018 | |
| JP | 2018-533857 | A | 11/2018 | |
| WO | WO-02084980 | A1 * | 10/2002 | G06F 21/10 |
| WO | 2015/116681 | A1 | 8/2015 | |

* cited by examiner

| Application(s) | Service Layer (SL) | Application Protocols (e.g. HTTP, COAP, MQTT) | Transport Protocols (e.g. TCP, UDP) | Network Protocols (e.g. IPv4/IPv6) | Access Network Protocols (e.g. Ethernet, Cellular, Wi-Fi) |
|---|---|---|---|---|---|

CONTEXT AWARE AUTHORIZATION FOR DATA AND SERVICES IN THE IOT/M2M SERVICE LAYER

CROSS-REFERENCE TO RELATED APPLICATION

This application is the National Stage Application of International Patent Application No. PCT/US2018/066254, filed Dec. 18, 2018, which claims the benefit of U.S. Provisional Application No. 62/607,006 filed Dec. 18, 2017, the content of which is hereby incorporated by reference in its entirety.

BACKGROUND

An M2M/IoT service layer is a technology specifically targeted towards providing value-added services for M2M/IoT devices and applications. Recently, several industry standard bodies (e.g., oneM2M, ETSI, OCF and LWM2M) have been developing M2M/IoT service layers to address the challenges associated with the integration of M2M/IoT devices and applications into deployments with the Internet/Web, cellular, enterprise, and home networks.

An M2M/IoT service layer can provide applications and devices access to a collection of M2M/IoT oriented capabilities. A few examples include security, charging, data management, device management, discovery, provisioning, and connectivity management. These capabilities may be made available to applications via APIs which make use of message formats, resource structures and resource representations supported by the M2M/IoT service layer.

SUMMARY

An Authorization Verification Service (AVS) is disclosed that may be provided by an IoT/M2M service layer to registrants of the service layer for Dynamic Context Aware Authorization. The AVS may allow the IoT/M2M service layer entities to define dynamic limits for authorizing access to services or data. The limits may be set, for example, in terms of the number of allowed accesses. When an IoT/M2M registrant makes a request for data or services for which it has dynamic context aware authorization, the AVS may maintain records of the remaining accesses available. The requestor can be any IoT/M2M service layer registrant or a proxy for an IoT/M2M service layer registrant.

The following example functionality can be supported by the proposed AVS: dynamically propagating authorization policies to new data and services that are within the scope of existing authorization policies, allowing an IoT/M2M service layer registrant to embed dynamic context aware authorization terms into an IoT/M2M service layer, managing by an IoT/M2M service layer access to the data and services based on these dynamic context aware authorization terms, updating by the IoT/M2M service layer the state of dynamic context aware authorization terms, and revoking access privileges when the limits or conditions of the dynamic context aware authorization terms are exhausted. However, it is understood that the AVS is not limited to these above described functionalities.

By using the methods and systems described herein, an IoT/M2M sensor or application can embed additional features and capabilities into a dynamic context aware authorization policy that grants authorization to access data and services in the IoT/M2M service layer. There can be rules that describe how a policy can be propagated to other data and services, how additional system context can be considered when authorizing a particular operation, and how expected behavior and characteristics of a device or entity can be described and enforced by the IoT/M2M service layer. These ideas can lead to easier deployment, more efficient operations, more secure operations, and more reliable operations.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 1 shows an example protocol stack supporting a service layer;

DETAILED DESCRIPTION OF ILLUSTRATIVE EMBODIMENTS

IoT/M2M service layer architectures are focused on value-added features and solutions that enable applications to access data from sensors or other applications on a communications network. Existing service layers can offer context based authorization, such as requiring the location of the requestor to be within a ten meter radius of a fixed location. The methods and systems described herein may allow the authorization context to be dynamically changed based on conditions of the system.

Figure 2:
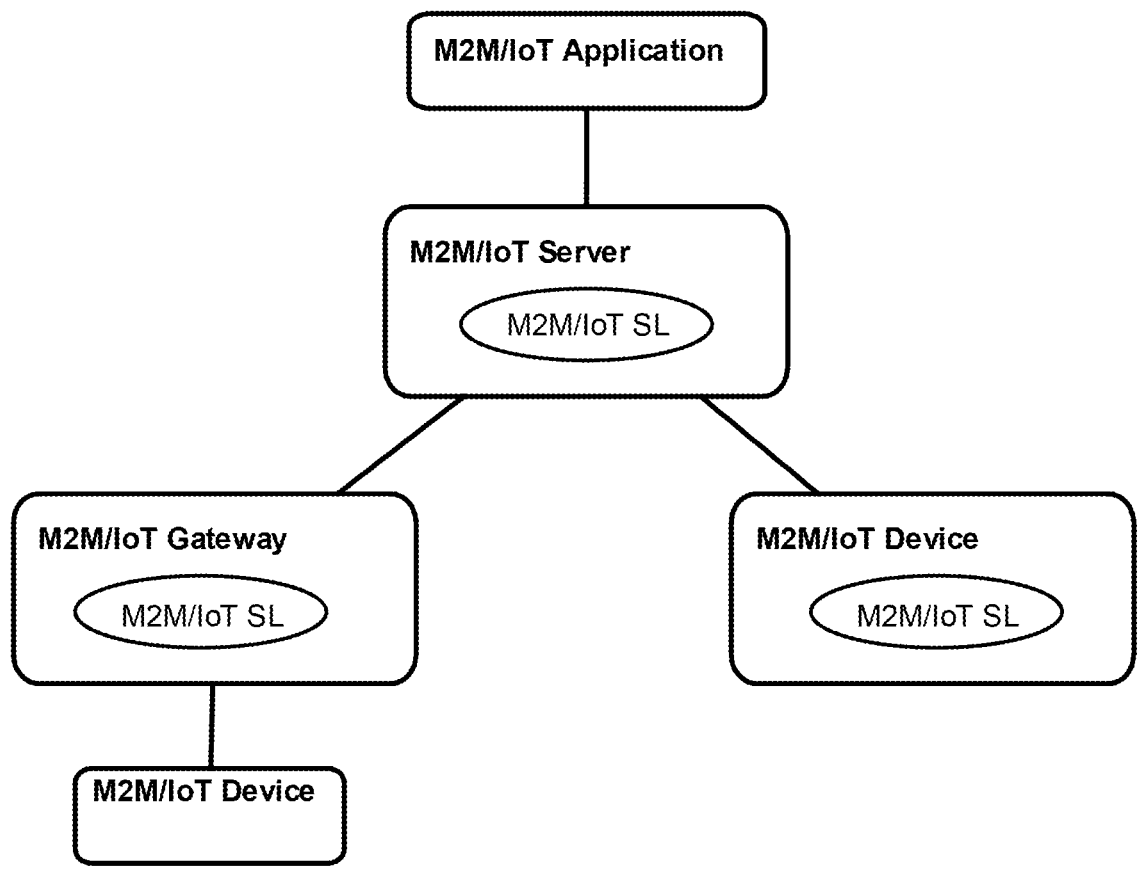
FIG. 2 shows an example M2M/IoT service layer deployed on various types of network nodes.

From a protocol stack perspective, service layers are typically situated above the Application Protocol Layer and provide value added services to applications they support. Hence, service layers are often categorized as 'middleware' services. FIG. 1 shows an example service layer situated between the application protocols and the applications. From a deployment perspective, an M2M/IoT service layer can be deployed on various types of network nodes including servers, gateways, and devices, as shown in FIG. 2.

Figure 3:
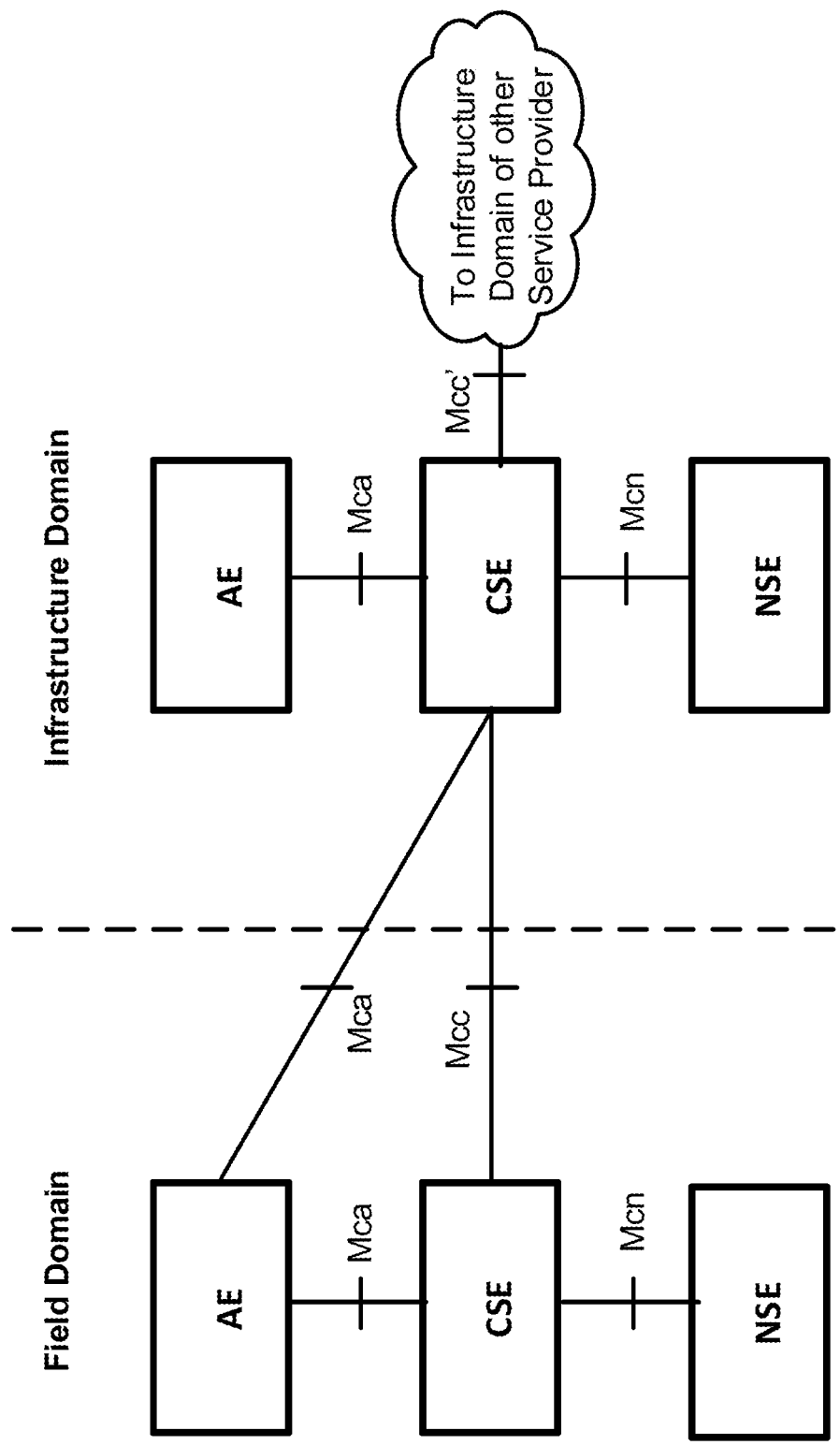
FIG. 3 shows an example oneM2M architecture.
Figure 4:
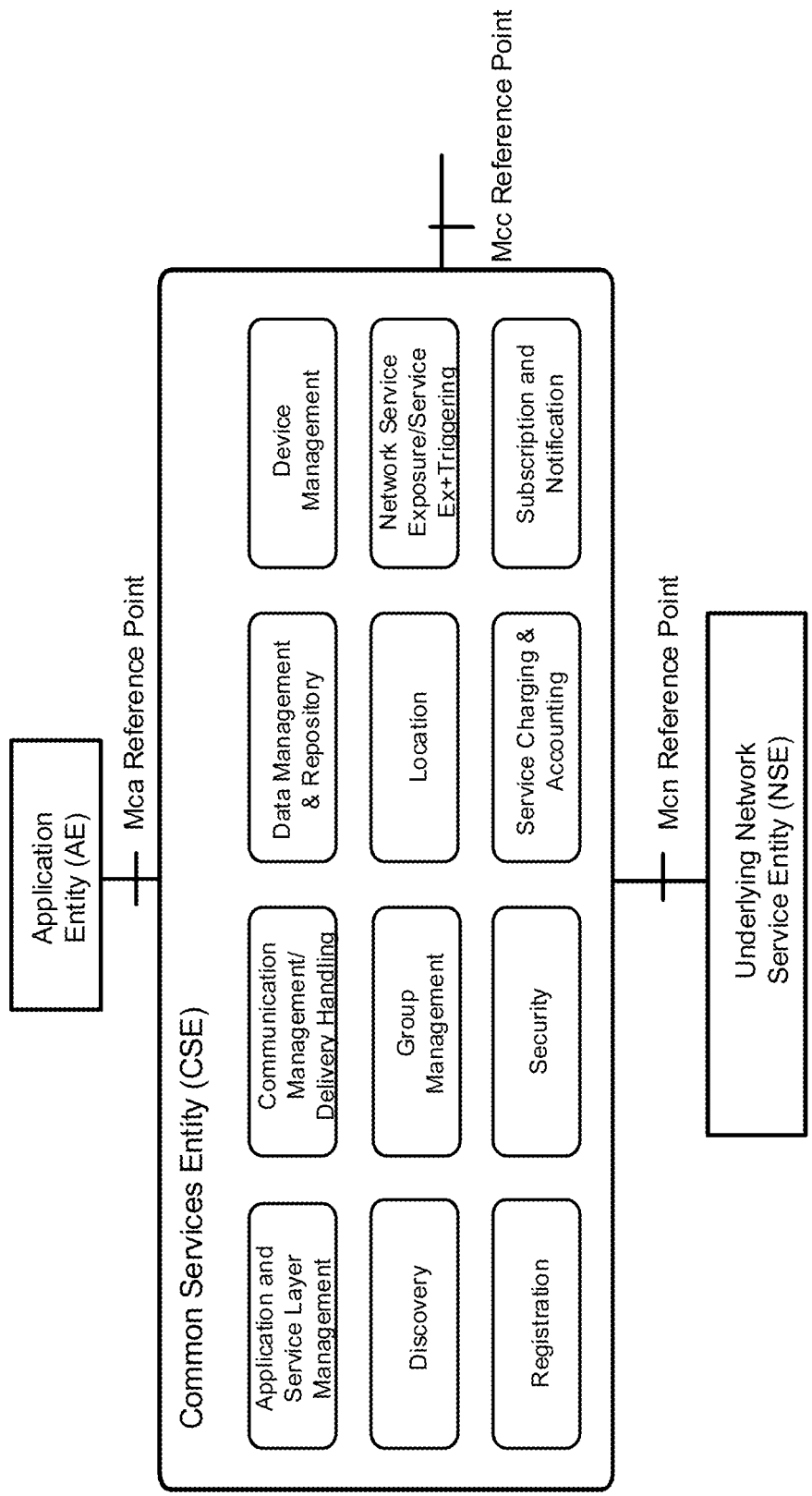
FIG. 4 shows example oneM2M common service functions.

The oneM2M standard defines a M2M/IoT service layer (see oneM2M TS-0001 oneM2M Functional Architecture-V-3.6.0). The purpose of the service layer is to provide "horizontal" services that can be utilized by different "vertical" M2M systems and applications, such as e-Health, fleet management, and smart homes. The architecture of the oneM2M service layer, as shown in FIG. 3, defines a Common Service Entity (CSE) that supports four reference points. The Mca reference point may interface with the Application Entity (AE), the Mcc reference point may interface with another CSE within the same service provider domain, the Mcc' reference point may interface with another CSE in a different service provider domain, and the Mcn reference point may interface with the underlying network service entity (NSE). An NSE provides underlying network services to the CSEs, such as device management, location services and device triggering. A CSE contains multiple logical functions called Common Service Functions (CSFs), such as "Discovery" and "Data Management & Repository." FIG. 4 illustrates example CSFs that are supported by oneM2M.

The oneM2M architecture is a distributed architecture that supports deploying M2M/IoT services in a distributed manner across the following example types of Nodes:

Application Service Node (ASN): an ASN is a node that contains one CSE and contains at least one application entity (AE). In one example, an ASN could reside in an M2M device;

Application Dedicated Node (ADN): an ADN is a node that contains at least one AE and does not contain a CSE. In one example, an application dedicated node could reside in a constrained M2M device;

Middle Node (MN): a MN is a node that contains one CSE and contains zero or more AEs. In one example, a MN could reside in an M2M gateway;

Infrastructure Node (IN): an IN is a node that contains one CSE and contains zero or more AEs. A CSE in an IN may contain CSE functions not applicable to other node types. In one example, an IN could reside in an M2M service infrastructure; and Non-oneM2M Node (NoDN): a non-oneM2M Node is a node that does not contain oneM2M Entities (neither AEs nor CSEs). Such nodes represent devices attached to the oneM2M system for interworking purposes, including management.

Figure 5:
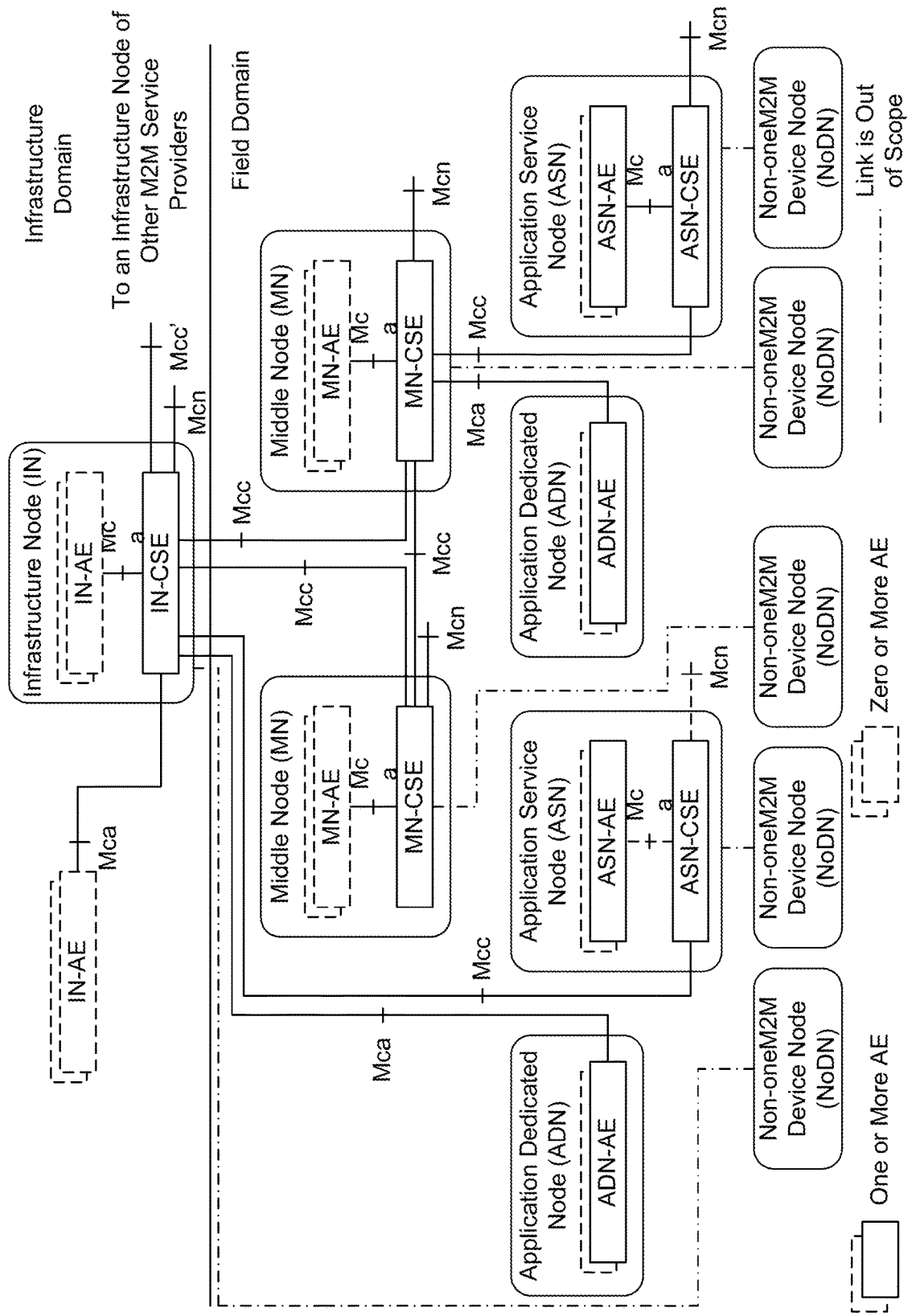
FIG. 5 shows example configurations supported by the oneM2M architecture.

Example configurations of inter-connecting the various entities supported within the oneM2M system are illustrated in FIG. 5.

Figure 6:
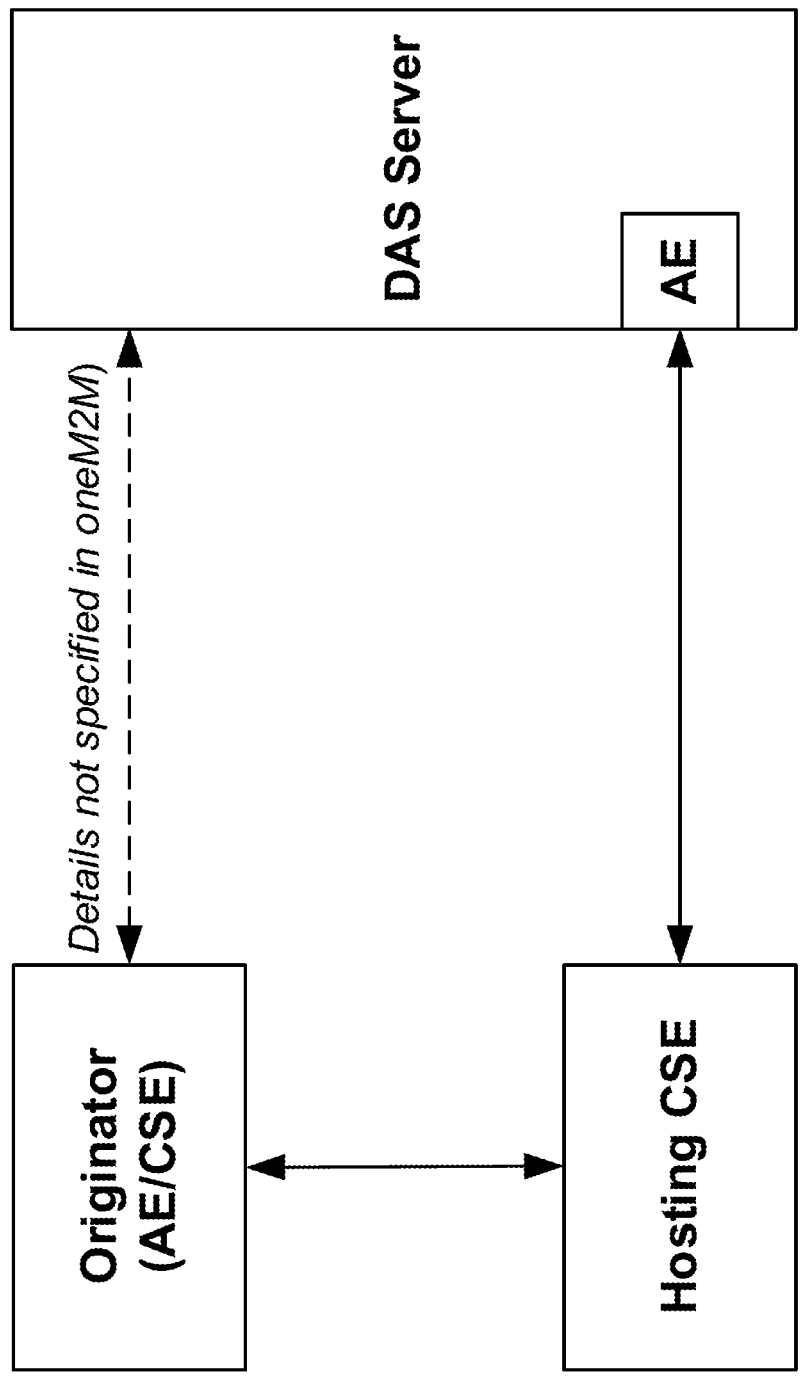
FIG. 6 shows an example flow chart for oneM2M dynamic authorization.

The oneM2M dynamic authorization model supports the ability of providing dynamic authorization to resources on behalf of the resource's owner. This may comprise a dynamic authorization system server that is configured with policies for dynamic authorization and is provided with credentials for issuing tokens that grant authorization, as shown in FIG. 6.

When a oneM2M entity attempts to access a resource that it does not have existing permission to access, the dynamic authorization procedure can be configured to attempt to obtain the requested permissions from the DAS server.

Figure 7:
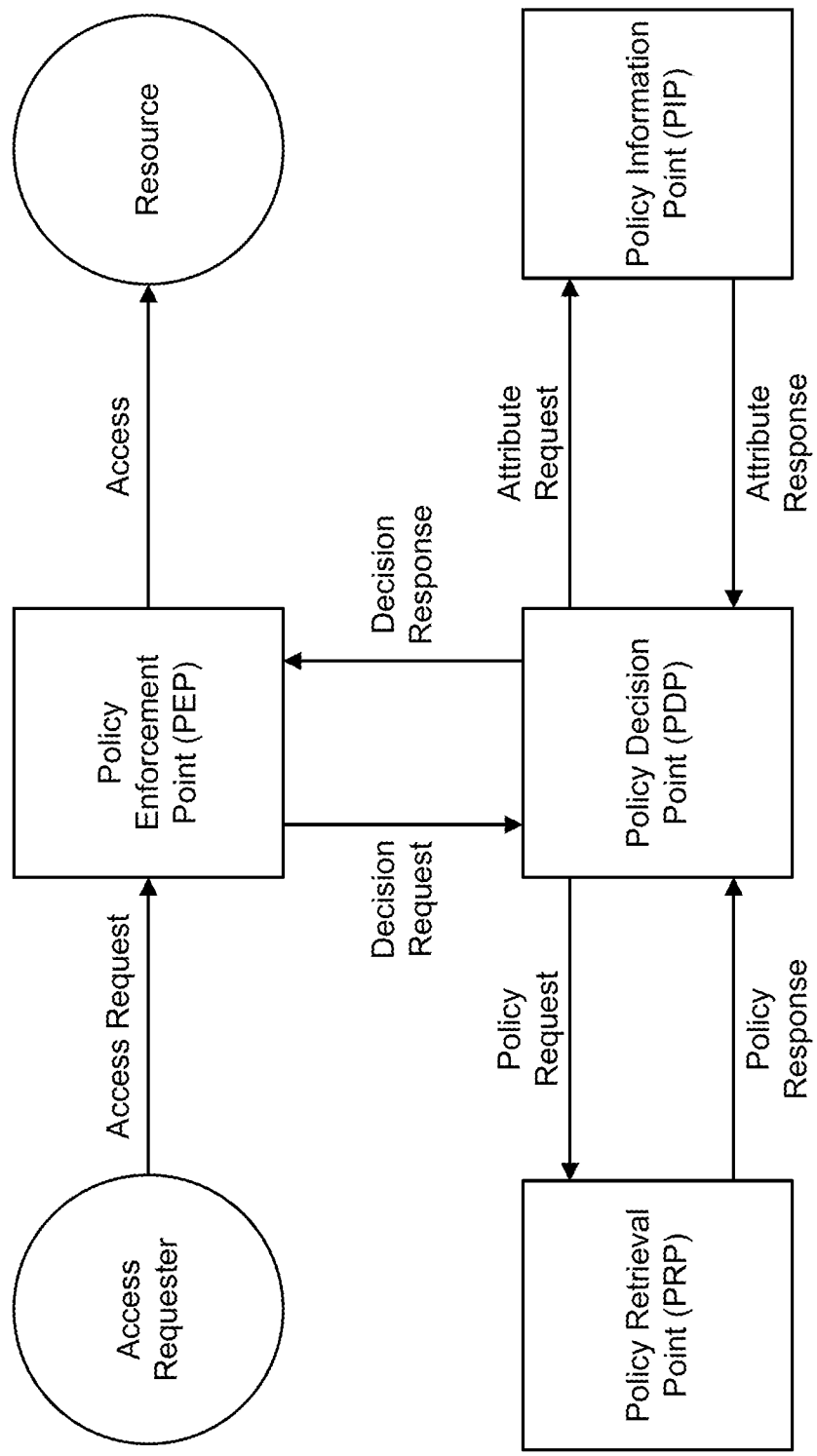
FIG. 7 shows an example flow chart for a oneM2M distributed authorization procedure.

The oneM2M distributed authorization procedure defines the basic steps to determine if a oneM2M entity should be granted access to a resource. The components of the distributed authorization procedure (PEP, PRP, PDP, and PIP), as shown in FIG. 7 and described below, can be distributed across different nodes or all collated on a single node:

Policy Enforcement Point (PEP): this component may intercept resource access requests, make access control decision requests, and enforce access control decisions. The PEP may coexist with the entity that needs authorization services;

Policy Decision Point (PDP): this component may interact with the PRP and PIP to get applicable authorization polices and attributes needed for evaluating authorization policies, respectively, and may evaluate access requests using authorization policies for rendering an access control decision;

Policy Retrieval Point (PRP): this component may obtain applicable authorization policies according to an access control decision request. These applicable policies may be combined in order to get a final access control decision; and Policy Information Point (PIP): this component may provide attributes that are needed for evaluating authorization policies, such as the IP address of the requester, creation time of the resource, and the current time or location.

Three example use cases are described herein:

Context Aware Access Use Case #1: New Device Authorization—standardized IoT/M2M service layers are intended to facilitate easier application development that leads to cost efficiency for development, deployment and integration into existing systems. When adding new devices such as sensors or actuators, it should not be difficult to integrate those devices into the applications that manage the systems that those devices are becoming a part of. For example, adding a new smart light bulb should be simple to integrate into the smart home application that each family member uses to manage devices within the home. If the light bulb is located in the family room, all members of the family should be able to control the smart bulb, however if the bulb is located in the parent's master bedroom, the children may not be authorized to access the smart bulb. These different authorizations should be easy to configure by considering the context of the configuration of the smart bulb.

Context Aware Access Use Case #2: Other than Originator Context—some IoT/M2M Service Layers support access policies that depend on the context of the requestor/originator. For example, one might give authorization to access the door lock if the request comes from an originator when their location is close to the house. Some interesting scenarios can be developed using the context of entities other than the originator. For example, authorization to access the door lock can be granted only if the home owner is not home.

Context Aware Access Use Case #3: Malfunctioning Device—IoT/M2M devices are likely to be autonomous sensors or applications that send and retrieve data from the IoT/M2M service layer. The use of popular standardized or proprietary IoT/M2M solutions by many sensor and application vendors can lead to some devices that do not perform properly, either by malfunction or by deliberate design, that can lead to degraded system performance. For example, a sensor at an intersection that counts vehicles as they pass can be expected to send a message indicating a passing vehicle at a maximum rate of one per second. However, if the device somehow malfunctions, such that the messages are being sent at a much higher rate, this could impact the entire IoT/M2M service layer. For example, this could cause outage problems at the IoT/M2M Service Layer, this could cause unexpected data storage costs for the sensor "owner," and this could cause high data usage in applications that monitor this sensor.

Figure 8:
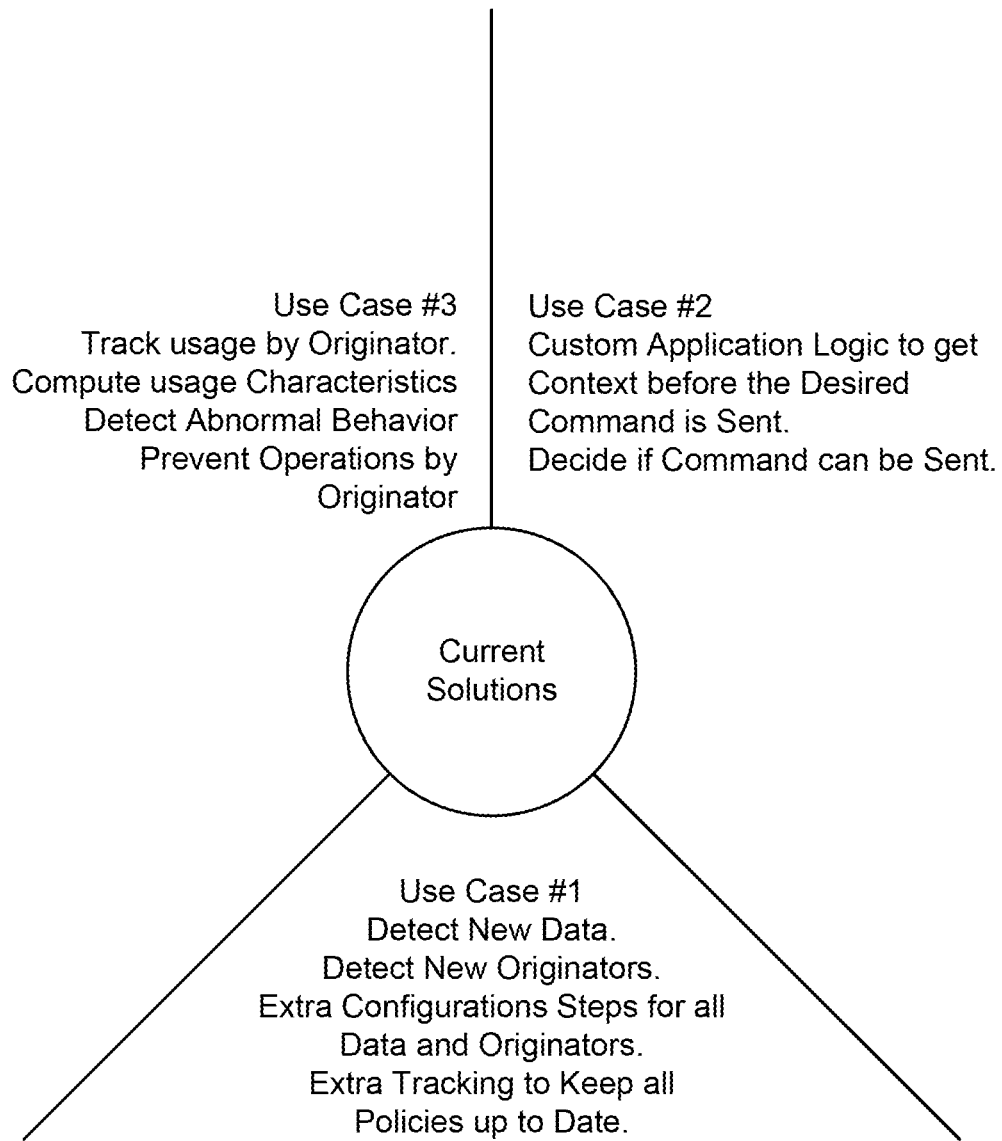
FIG. 8 shows current solutions for example use cases.

The different use cases described above highlight a need for improved context based authorization methods in IoT/M2M service layers. FIG. 8 shows some examples of how these use cases can be implemented.

When adding a new device to an existing system, as in use case #1, there are different ways to integrate the device or application. For example, in oneM2M, the procedure for granting authorization to use a smart light bulb can be done by adding a new access control policy that indicates which users in the home should have permissions. This can lead to having a policy for each device or application in the system. An alternative may be to create a policy that can be applied to multiple devices or applications. What seems to happen in practice is that authorizations are either too restrictive, only allowing a single entity to have control, or the opposite where very little restrictions are implemented for the authorization policy.

Adding context related to entities other than the originator, as in use case #2, to the decision process for granting authorization to access data can lead to privacy issues, more application complexity and decentralized policy control. These approaches can be unreliable and potentially add security risks.

In the case of a malfunctioning device, described in use case #3, a service layer may need to determine a way to define the expected operational characteristics of a particular device or application and then capture the actual operational characteristics and detect/prevent abnormal operations. This may need to be done for every device and application that uses the IoT/M2M service layer. There is currently no defined mechanism to do this.

IoT/M2M service layer architectures are focused on value-added features and solutions that enable applications to access data from sensors or other applications. Existing service layers can offer context based authorization, such as requiring the location or the requestor to be within a ten meter radius of a fixed location. The methods and systems described herein may allow the authorization context to be dynamically changed based on conditions of the system.

An Authorization Verification Service (AVS) is disclosed that may be provided by an IoT/M2M service layer to registrants of the service layer for Dynamic Context Aware Authorization. The AVS may allow the IoT/M2M service layer entities to define dynamic limits for authorizing access to services or data. The limits may be set, for example, in terms of the number of allowed accesses. When an IoT/M2M registrant makes a request for data or services for which it has dynamic context aware authorization, the AVS may maintain records of the remaining accesses available. The requestor can be any IoT/M2M service layer registrant or a proxy for an IoT/M2M service layer registrant.

The following example functionality can be supported by the proposed AVS: dynamically propagating authorization policies to new data and services that are within the scope of existing authorization policies, allowing an IoT/M2M service layer registrant to embed dynamic context aware authorization terms into an IoT/M2M service layer, managing by an IoT/M2M service layer access to the data and services based on these dynamic context aware authorization terms, updating by the IoT/M2M service layer the state of dynamic context aware authorization terms, and revoking access privileges when the limits or conditions of the dynamic context aware authorization terms are exhausted. However, it is understood that the AVS is not limited to these above described functionalities.

By using the methods and systems described herein, an IoT/M2M sensor or application can embed additional features and capabilities into a dynamic context aware authorization policy that grants authorization to access data and services in the IoT/M2M service layer. Rules may be provided that describe how a policy can be propagated to other data and services, how additional system context can be considered when authorizing a particular operation, and how expected behavior and characteristics of a device or entity can be described and enforced by the IoT/M2M service layer. These features can lead to easier deployment, more efficient operations, more secure operations, and more reliable operations.

In one embodiment, an authorization verification service of a service layer may be configured to perform operations comprising: receiving, from a device, a request to access at least one of data or a service made available by the service layer; determining an authorization policy associated with the at least one of the data or service made available by the service layer; determining one or more context aware states associated with the authorization policy, wherein the one or more context aware states comprise an indication of one or more conditions for accessing the at least one of the data or service made available by the service layer, and wherein the one or more conditions comprise a number of allowed accesses to the at least one of the data or service made available by the service layer; determining whether the one or more conditions associated with the one or more context aware states are valid; and granting, to the device and based on determining that the one or more conditions associated with the one or more context aware states are valid, access to the at least one of the data or service made available by the service layer.

The one or more conditions associated with the one or more context aware states may further comprise a time duration for accessing the at least one of the data or service made available by the service layer. The one or more conditions associated with the one or more context aware states may further comprise a type of device that is allowed access to the at least one of the data or service made available by the service layer. The one or more conditions associated with the one or more context aware states may be independent of the device and the request to access the at least one of the data or service made available by the service layer. The authorization verification service may determine the context aware states based on one or more of data stored by the service layer or operations performed by the service layer. The one or more context aware states may be stored in the authorization policy. The operations may further comprise updating, based on granting access to the at least one of the data or service made available by the service layer, the one or more context aware states associated with the authorization policy.

In another embodiment, an authorization verification service of a service layer may be configured to perform operations comprising receiving, from a core services function of the service layer, a request to access at least one of data or a service made available by the service layer; determining an authorization policy corresponding to the request; determining one or more context aware states associated with the authorization policy; and determining, based on the one or more context aware states, whether to grant, to a service layer entity, access to the data or service made available by the service layer.

The context aware states may be stored in the corresponding authorization policy. In one example, the context aware states associated with the authorization policy may comprise a time duration of the policy or a number of allowed accesses to the policy. The authorization verification service may determine the context aware states based on data stored by the service layer or operations performed by the service layer. The authorization verification service may grant, in response to determining that one or more conditions of the context aware states have been met, access to the data or service made available by the service layer. In one example, the authorization verification service may update the one or more context aware states associated with the authorization policy. The authorization policy may be created using an authorization scope procedure. In one example, the authorization verification service may deny, in response to determining that one or more conditions of the context aware states have not been met, access to the data or service made available by the service layer. Further, the authorization verification service may delete the authorization policy or may trigger one or more dynamic authorization procedures.

The IoT/M2M service layer can allow the IoT/M2M service layer registrant that creates or controls data hosted on the IoT/M2M service layer to define limits to the specified authorizations. For example, authorizations can allow ten accesses, one-hundred accesses or unlimited accesses. The AVS in the IoT/M2M service layer may check the context of authorization policies to verify that access is authorized and may check and update the states (e.g., context aware states) associated with the policy to make sure that the limits of the specified authorizations are not exceeded. When new services or data are made available, support for automatic propagation of existing authorization policies may be provided.

Figure 9:
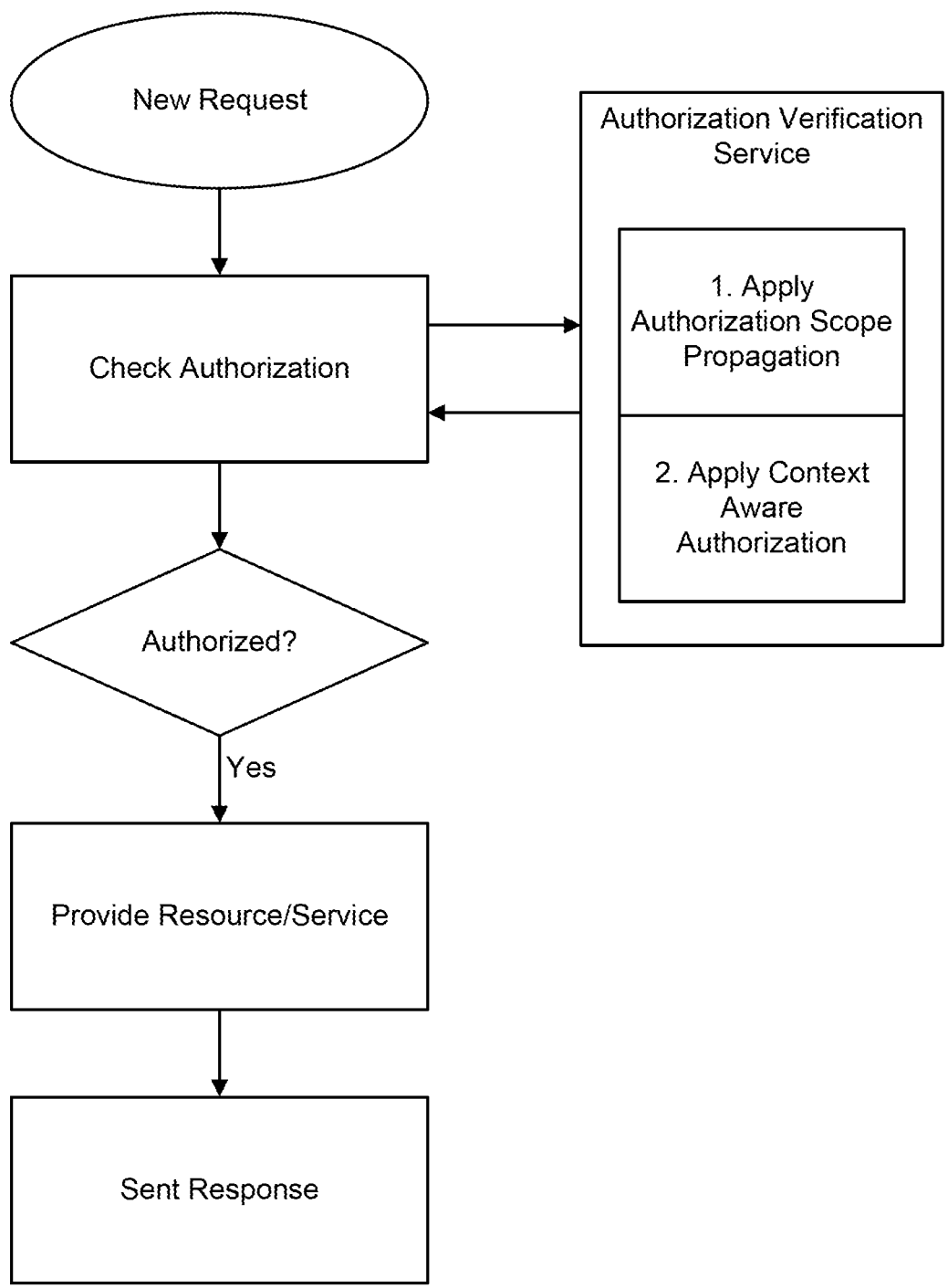
FIG. 9 shows an example authorization verification service.

When a request is made for a service or a resource in an IoT/M2M service layer, the request may be checked against a set of permissions that define whether it should be "authorized" or "denied" to the requestor. If the existing authorization policies indicate that the request is "authorized," then the IoT/M2M service layer may give access to the resource or service. In one embodiment, the "Authorization Verification Service" may have two components, as shown in FIG. 9. First, if the request was not "authorized" by a policy linked to the data or service requested, then the AVS may search to see if a defined (preconfigured or provisioned prior to the request) Authorization Scope exists that grants authorization. It should be noted that this is not a process of getting authorization where none previously existed, but rather searching for a policy that exists that includes this request in its "Authorization Scope." Second, the policy that "authorized" a request may be further examined to see if there are "dynamic contexts" that may need to be met in order to authorize the requested operation.

A policy may be defined as document or data structure that can be processed by a software algorithm to determine if the request is authorized. When a request is made to access data or services hosted by the IoT/M2M service layer, a check may be made to see if there is a policy that gives authorization to the request originator. In a RESTful system, each data element or service may refer to an existing policy that is used to make this determination. In some cases, the data or service being requested can inherit references to existing policies based on the hierarchical structure of the data or services. For example, an IoT/M2M entity may be granted authorization to all data or services identified as a direct descendent of a root location. In one embodiment, the policy may be stored at the service layer. For example, the policy may be stored as an XML or JSON document or in a table stored at the service layer.

Methods of automatically propagating access to groups of data or services may be extended by defining an "Authorization Scope." The Authorization Scope may specify sets of data or services that can be accessed by the IoT/M2M entities defined in the policy. In one embodiment, the specification of the data and services can be an explicit list of data and services, or it can be based on values of the metadata associated with the data or service. The Authorization Scope may be an enhancement to existing policy definitions or it can be a separate or new policy type. In one embodiment, the Authorization Scope may have one or more of the following components: identity of data or services that this policy applies to, values of metadata of data or services that this policy applies to, identity of IoT/M2M entities that this policy applies to, and the specific permissions granted to the entity accessing the data or service. This policy may be stored as an XML or JSON document or in a table stored at the service layer.

Figure 10:
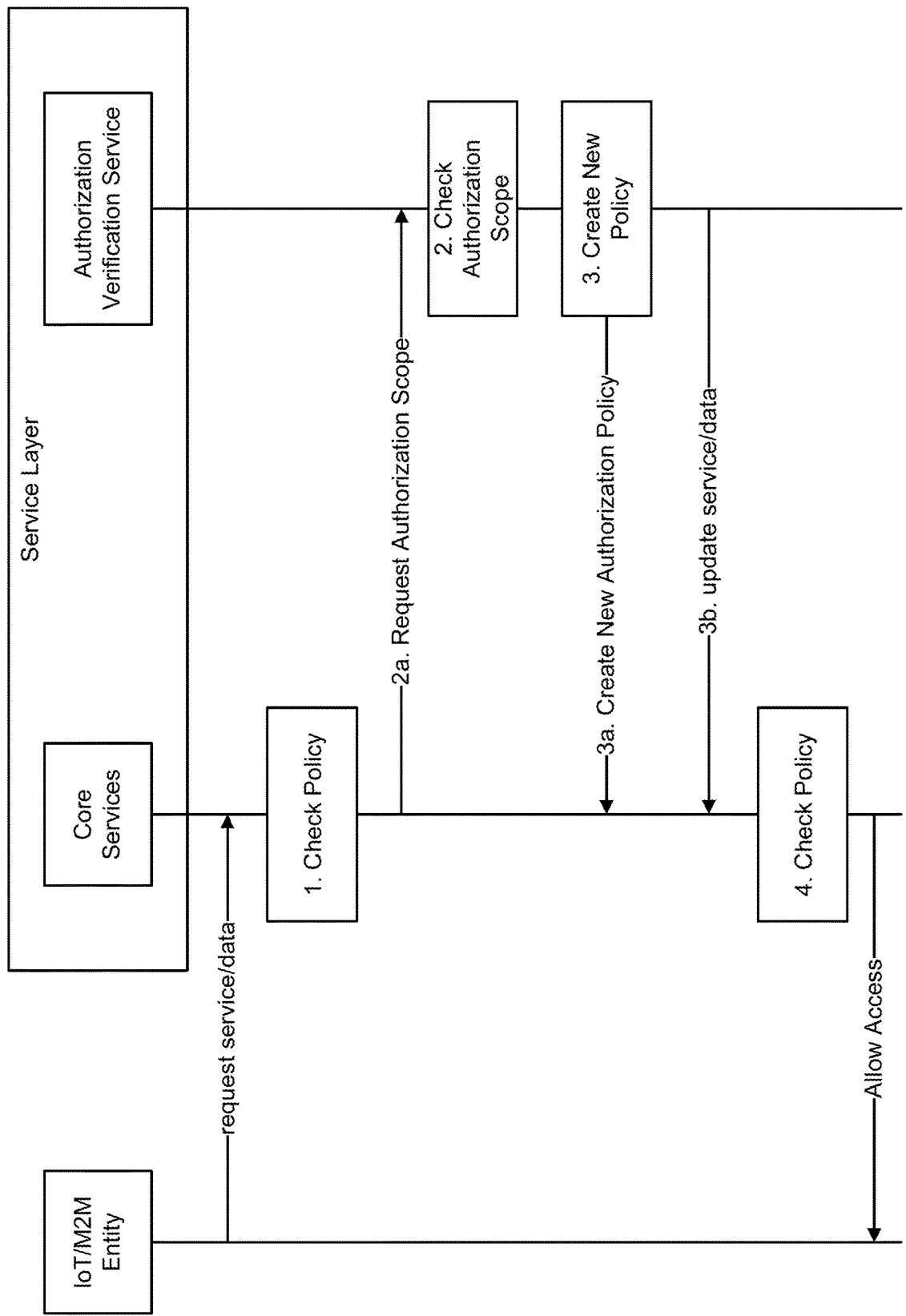
FIG. 10 shows an example flow chart for authorization scope.

For example, PROVIDER1 of data hosted in the IoT/M2M service layer can create a policy that specifies that USER1 can access all data created/owned by PROVIDER1 and has metadata indicating that the data is CATEGORYA. Using an Authorization Scope, when new data is created by PROVIDER1 with CATEGORYA specified in the metadata, USER1 may dynamically be authorized to access the new data without regard to the hierarchical location of the data (unless desired). In an IoT/M2M application, this can simplify the process of granting access to data from new sensors that are deployed without the need to configure SL authorization policies for each sensor. FIG. 10 shows an example embodiment of the steps needed to implement "Authorization Scope."

In step 1, when a new request arrives, the IoT/M2M service layer searches for authorization policies that apply to the specific service or data being requested. When the polices are identified, they may be checked to see if the originating IoT/M2M entity has authorization to perform the requested operation. If it is determined that the request is "authorized," then the IoT/M2M service layer may give access to the data or service. If not authorized, the procedure may continue to step 2 by issuing a request to the AVS. The "request authorization scope" message (2a) may contain one or more of an identifier of the requested data or service, an identifier of the requestor, and an identifier of the operation requested.

In step 2, the AVS searches for policies that have "Authorization Scope" specified. If a policy is found that has "Authorization Scope" defined that applies to the requested data or service AND the IoT/M2M entity making the request AND the operation requested, then the request is determined to be "authorized." The metadata (descriptive, structural and administrative) of the data or service requested can be considered when making this "Authorization Scope" evaluation. For example, the policy can require that a tag or label of the requested data or service contain a specific value or token.

In step 3, the "Authorization Scope" can define whether a new policy should be created (3a) for the requested service/data or assigned the current policy or another existing policy to the service/data (3b). The IoT/M2M service layer may update the metadata associated with the requested data or service to reflect that the policy found in step 2 or created in this step should be considered for future requests. For example, metadata or an attribute that is attached to the data or service can be updated with a pointer to the new policy.

It is understood that steps 1-3 may be consolidated in implementation.

These new policy aspects may be used to manage the lifetime of the Authorization Policy allowing IoT/M2M service layers to offer advanced capabilities with easier call flows. For example, the new feature that enables the definition of a policy that allows a maximum of ten authorizations can be enhanced to automatically delete the policy after the authorizations are exhausted. Alternatively, the policy can reset each day offering the ability to specify a daily limit. Example information in the new policy is listed in Table 1 and may be included in the "Update Service/Data" message.

TABLE 1

Context Aware Authorization Aspects

| Field | Description |
| --- | --- |
| authorizationScope | List of data or services that this authorization policy applies to. This field can specify specific individual data or services, groups of data or services based on hierarchy or structure, groups of data based on other meta-data associated with the data or service. |
| timeDuration | A value that indicates how long the Authorization should last following the automatic creation of the policy. An example use would be giving a limit of 1 hour after the first access. |
| resetCondition | This value or condition indicates when the states being tracked are reset. For example, a resetCondition could be the definition of a schedule used with maxDownload to indicate a daily limit. The conditions for reset can be based on meta-data about the requestor as well as global or system attributes like time, date, or location. |
| deleteWhenExhausted | Once the specified permissions are exhausted, this policy can be deleted automatically. |
| assignPolicy | A value that indicates that this policy should be applied to the service/data requested. Alternatively, a new policy can be created and assigned to the service/data requested. |
| permissionsGranted | Definition of the permissions granted to the requestor and contexts that may limit the permissions granted (such as Dynamic Context States). |
| entitiesAuthorized | Identity of the IoT/M2M entities that the Authorization scope applies to. |

Additional explanations or procedures for using some of the contexts described in Table 1 are provided below.

The timeDuration aspect may be used to specify how long the policy can remain in effect. This may be used when a new policy is created when the Authorization Scope procedure creates a new policy. The timeDuration value may be added to the current time (time of creation of a new policy) to specify the expiration time of the new policy.

The resetCondition aspect may be used to specify a time or condition when current dynamic states are reset to an initial value, such as zero. In an example use of the reset-Condition aspect, an IoT/M2M Service Layer may want to authorize an IoT/M2M entity to perform 12 uploads each hour. The IoT/M2M Service Layer may update the count dynamic context after each upload, authorizing the request if the count is less than countLimit. Each hour, the IoT/M2M Service Layer may reset the count dynamic context back to zero.

The deleteWhenExhausted dynamic context is used to make management of Dynamic Context Aware Authorizations easier for applications and the IoT/M2M service layer. This allows a mechanism for removing policies that are no longer valid or useful. If this value is specified as "true" then, if a dynamic context check does not grant authorization and if the reset condition is not specified, then the policy may be deleted by the IoT/M2M service layer.

If an authorization policy exists for the user to access the resource, the Dynamic Context Aware Authorization may evaluate whether there are conditional contexts associated with the policy. Note that the authorization policy may exist for the user through provisioning or may be created by the "Authorization Scope" procedure described herein. If a determination is made that dynamic context aware authorization applies, the AVS may modify states corresponding to the specified context.

Figure 11:
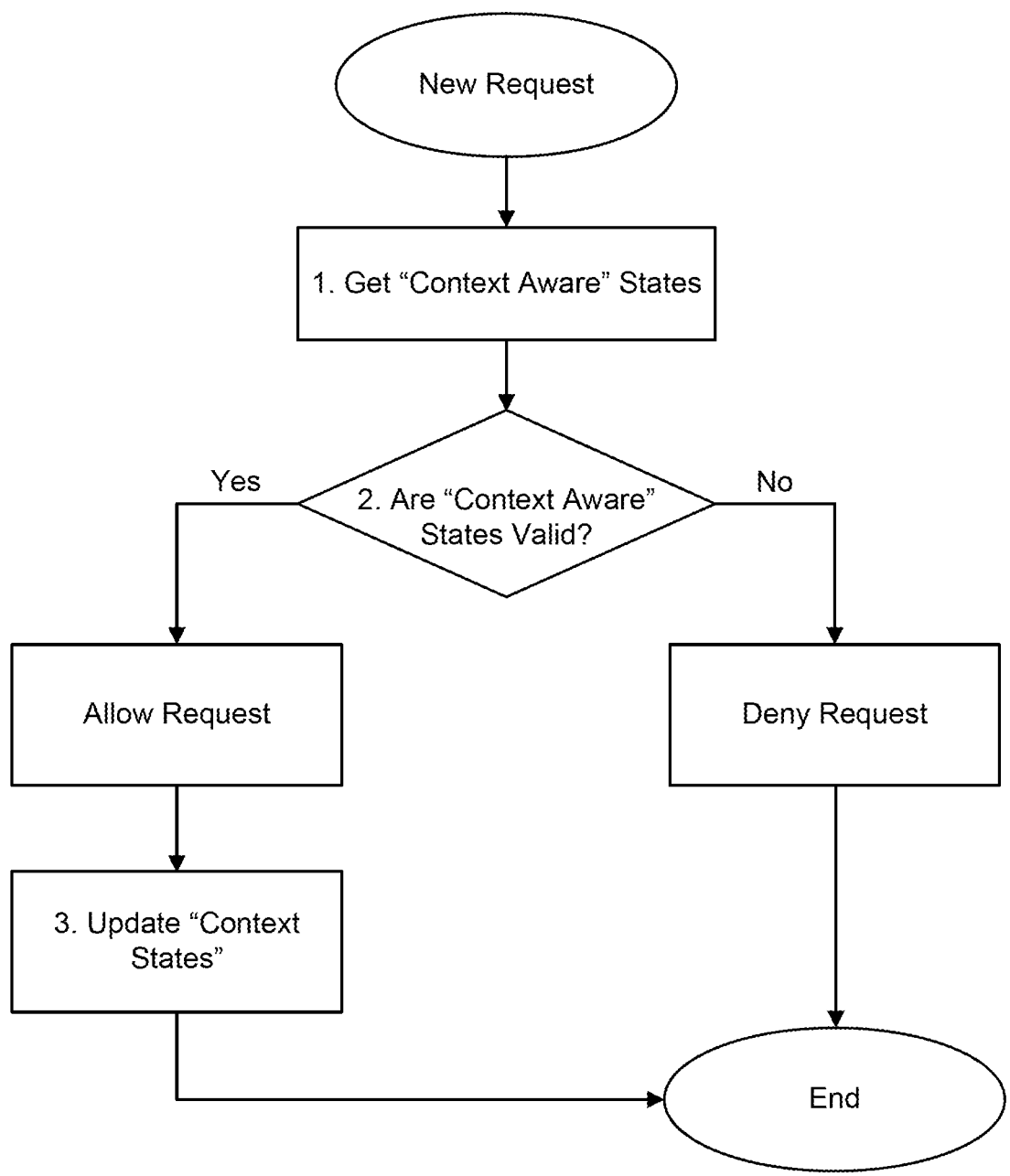
FIG. 11 shows an example flow chart for authorization state management.

FIG. 11 shows a call flow for the AVS to manage the states associated with Context Aware authorization states.

In step 1, the AVS gets the Context Aware states if they are specified in the authorization policy. The information needed to check a context may be described in the authorization policy. The dynamic states can be stored in the policy or they may require checking other IoT/M2M Service Layer data or operations to determine the state and context.

In step 2, if the current Context Aware states meet all the conditions specified by the policy, then authorization can be granted. If the conditions are not met, then the authorization is not granted. The Authorization decision may be provided back to the Service Layer. This can also trigger the Authorization Scope procedure.

In step 3, the AVS adjusts the Context Aware states if they are specified. This may comprise adding to a counter attribute or subtracting from a countdown attribute. If the dynamic context aware state is based on payload size, then this adjustment may occur after the response is sent to the user. For example, if maxDownload state is used, after the payload is sent in a response, the information may be available to update a "download counter."

If the Context Aware states do not meet the conditions to allow access, then the AVS can trigger dynamic authorization procedures or it can remove or revoke the Context Aware authorization policy.

Authorization is generally applied to the basic operations of CRUD, which are CREATE, RETRIEVE, UPDATE and DELETE. Authorizations can also be applied to operations that are derived from CRUD, such as NOTIFY and DISCOVERY (as an example from oneM2M). An IoT/M2M entity may be given RETRIEVE authorization for a specified service or data. This is generally a static authorization or an authorization that changes infrequently. The information elements described herein enable dynamic conditions to be considered when determining if authorization is granted. For example, an IoT/M2M entity may be allowed to "unlock" a door to the house one time only when the "owner" is not home. The absence of Context Aware authorization information implies unlimited accesses.

TABLE 2

Context Aware Authorization Fields

| Field | Description |
| --- | --- |
| count | A value that indicates the number of "authorizations" to a service or data that an IoT/M2M registrant has used. |
| countLimit | A value that indicates the limit to the number of "authorizations" to a service or data that an IoT/M2M registrant can use. An example use of this field is when the "authorization" is valid/granted if "countLimit-count > 0." |
| countdown | A value that indicates the number of "authorizations" to a service or data that an IoT/M2M registrant has remaining. An example use of this field is when the "authorization" is valid/granted if "countDown > 0." NOTE that this can be implemented with the use of count/countLimit and therefore probably not used at the same time. |
| downloadAmount | A value that indicates the amount of data that has been downloaded to an IoT/M2M registrant. |
| maxDownloadAmount | Total amount of data that is allowed to be downloaded. This may limit RETRIEVE types of operations. |
| uploadAmount | A value that indicates the amount of data that has been uploaded from an IoT/M2M registrant. |
| maxUploadAmount | Total amount of data that is allowed to be uploaded. This may limit CREATE/UPDATE types of operations. |
| accessTechnology | This value indicates that this limit applies when a certain type of underlying network access technology is used. For example, if using cellular data, the limits would apply. |
| alertThresholdCount alertThresholdDownload alertThresholdUpload | Indicates the value that should trigger an alert when a specified count has been reached. This can apply to count, downloadCount, uploadCount or any other type limit applied to the authorization decision. The alert can be sent to a specified IoT/M2M registrant or to a default IoT/M2M entity (such as the originator, service subscriber, owner of the accessed data). |
| inVicinity outOfVicinity | Indicates that this Authorization is only granted when a specified IoT/M2M entity is "in a particular location" or "out of a particular location." |
| requestorCriteria | Conditions that must be true to grant access using this policy. For example, in oneM2M there could be a condition that the protocol used for the request is CoAP. Or there could be a requirement that only allows the requested operation if the requestor meets system limitations. For example, in oneM2M a CREATE CONTAINER request can be allowed only if the requestor has not already created 10 or more containers. |

An example use of the uploadCount dynamic context is to use the value specified as a definition of how much data can be created or stored in the IoT/M2M Service Layer by the IoT/M2M entity. The IoT/M2M service layer may update the uploadCount after each use of this policy to authorize an operation. If the uploadCount exceeds the maxUpload value, then a CREATE or UPDATE operation may not be authorized. If the operation requested by the IoT/M2M entity is RETRIEVE or DELETE then the maxUpload check may be ignored, but it could also still be applied. In the case of a RETRIEVE or DELETE operation, the uploadCount may not be updated.

The access Technology dynamic context may be used to restrict authorizations based on the type of access used to communicate with the IoT/M2M Service Layer. In an example use case, an IoT/M2M entity may have multiple ways of sending requests to the IoT/M2M Service Layer. However, the IoT/M2M may authorize the IoT/M2M entity to perform the operation on a specific device only if the request uses Bluetooth technology for the request.

The outOfVicinity and inVicinity dynamic context may be used to restrict authorizations based on where an IoT/M2M entity is located. This value can be applied to the IoT/M2M entity making the request. In addition, this value may be applied to any IoT/M2M entity using the methods and systems described herein. This may allow for easier development of IoT actuators and applications. For example, in a manufacturing plant that has the ability to turn on large machinery remotely, there may be implementations that check that no persons or objects are within a safety zone around the machine. The application may first check the safe zone and only send a signal to turn on the machine after the safe zone is clear. Embedding this safety zone check into the Authorization policy both simplifies the application and offers greater security by reducing the possibility that an error in the application allowed the signal to turn on the machine without checking the safe zone.

The requestorCriteria dynamic context may be used to restrict authorization based on IoT/M2M Service Layer operations that have been performed throughout the IoT/M2M Service Layer, as opposed to requests for the specific data or service that the policy applies to. For example, in oneM2M, a create contentInstance operation can be authorized if the requestor has created less than 100 contentInstances under a specific resource.

The oneM2M Service Layer authorization system may consist of the following example logical functions:

Authorization Scope Management (ASM): this function determines if there is an existing <accessControlPolicy> that has an authenticationScope attribute that includes the targeted resource and the originator of the request. If one is found, the acpi may be updated to include the existing <accessControlPolicy>. If oneM2M's distributed authorization is implemented, the functionality of the ASM could be included in the PRP;

Authorization Context function (ACF): this function collects any context information defined by the <accessControlPolicy> that cannot be derived from the request primitive sent by the originator. For example, the <accessControlPolicy> may specify that the location of AEHomeOwner is needed to evaluate whether this request is authorized. The ACF may get the location of AEHomeOwner. The ACF could be implemented in oneM2M's PIP; and Adjust Authorization State (AAS): this function updates the <accessControlPolicy> attributes that contain states related to the operation requested/authorized. Any alert or other action that occurs after the <accessControlPolicy> is updated may be performed by the AAS. For example, if an alertThresholdCount is reached, the AAS can initiate a notification. The AAS could be implemented in oneM2M's PIP or PDP.

This embodiment of the Context Aware Authorization States adds new attributes to the existing oneM2M <accessControlPolicy> defined in the oneM2M TS-0001 oneM2M Functional Architecture-V-3.6.0. The resource definitions listed below generally only show the attributes and child resources relevant to ideas presented herein. Other attributes and child resources not shown here may be present in an actual embodiment.

oneM2M defines <accessControlPolicy> resources to specify which oneM2M entities can access a resource that is linked to the <accessControlPolicy>. For example, the privileges attribute may be specified by a set of access control rules. The access control rules may have sub-attributes, accessControlContexts and accessControlObjectDetails, that are enhanced with attributes and procedures, such as those disclosed herein.

The following new accessControlContexts may be considered for access control policy checks by the CSE.

The accessControlLocationRegion may be specified as either a country code or a set of three values representing latitude, longitude and radius. This disclosure adds a specifier to indicate that the entity shall be INSIDE the defined region or OUTSIDE the defined region when making the decision to authorize the operation. In one example, a list of entities can be specified to indicate that entities other than the originator must meet the location condition. If no entity is provided, the default behavior may be to apply the location comparison to the location of the Originator. If more than one region is defined for an entity, then the condition may need to be true for only one of the regions. If more than one entity is defined, then the conditions for all entities may need to be true.

If accessControlLimit or accessControlDataLimit is specified, then an authorization to perform the operation may not be allowed if the number of times that this <accessControlPolicy> resource was used exceeds the configured accessControlLimit or if the amount of data transferred exceeds the accessControlDataLimit. The count of the number of accesses may be stored in accessControlLimit and the amount of data transferred may be stored in accessControlDataLimit. These counts may be stored as Read Only attributes of the resource and these values are updated by the hosting CSE when a request is allowed based on this particular authorization policy.

oneM2M defines the accessControlObjectDetails as an optional parameter of an access control rule. It specifies a subset of child resource types of the targeted resource to which the access control rule applies.

The embodiment of the ideas described in this disclosure may expand the definition of accessControlObjectDetails to include the following new attributes.

TABLE 3

New Type of Parameter in accessControlContexts

| Name | Description |
| --- | --- |
| accessControlLocationRegion | Represents a location region constraint which is compared against the location of the Originator of the request. Additional location regions can be specified to indicate that another entity also has location region constraints. |
| accessControlLimit | Represents the number of times that the policy defined in this accessControlRule can allow authorization to the requested resource. A count is maintained of the number of authorizations granted based on this policy. The count value is compared against the specified countLimit. |
| accessControlDataLimit | Represents the amount of data in bytes that can be authorized to be transferred using this accessControlRule. A count is maintained for the amount of data transmitted. |

TABLE 4

New Types of Parameters in accessControlObjectDetails

| Name | Description |
| --- | --- |
| propagateACP | Indicates that this ACP can be applied to a descendant of the targeted resource. This ACP can be directly added to the targeted resource's accessControlPolicyIds attribute by the host CSE or a new ACP can be created by the host CSE based on the attributes of this ACP. |
| timeLimit | If propagateACP indicates that a new ACP is created, this attribute specifies the expirationTime of the new <accessControlPolicy> resource. If not set, the new <accessControlPolicy> resource may have the same expirationTime as the current <accessControlPolicy> |
| deleteWhenExhausted | When this authorization policy allows an originator to perform an operation but either the accessControlLimit or the accessControlDataLimit context conditions are not met causing the operation to be NOT_ALLOWED, then this authorization resource may be deleted if this value is TRUE. |

If an originator is not Authorized to perform an operation on a target resource, the Hosting CSE may check the ancestor resources of the target resource, up to the CSEBase, looking for an <accessControlPolicy> that has propagateACP attribute specified. If the <accessControlPolicy> found authorizes the requested operation, the Hosting CSE may either UPDATE the target resource's accessControlPolicyIDs attribute with the resource identifier of the <accessControlPolicy> or it may CREATE a new <accessControlPolicy> based on the attributes of the found <accessControlPolicy>. When creating a new <accessControlPolicy> the expiration Time may be set according to the value specified in timeLimit and the propagateACP may be set to null. When the Hosting CSE updates the target resource's accessControlPolicyIDs attribute, it can either add the <accessControlPolicy> resource identifier to any other resource identifiers in the list or set this <accessControlPolicy> as the only one in this list.

Figure 12A:
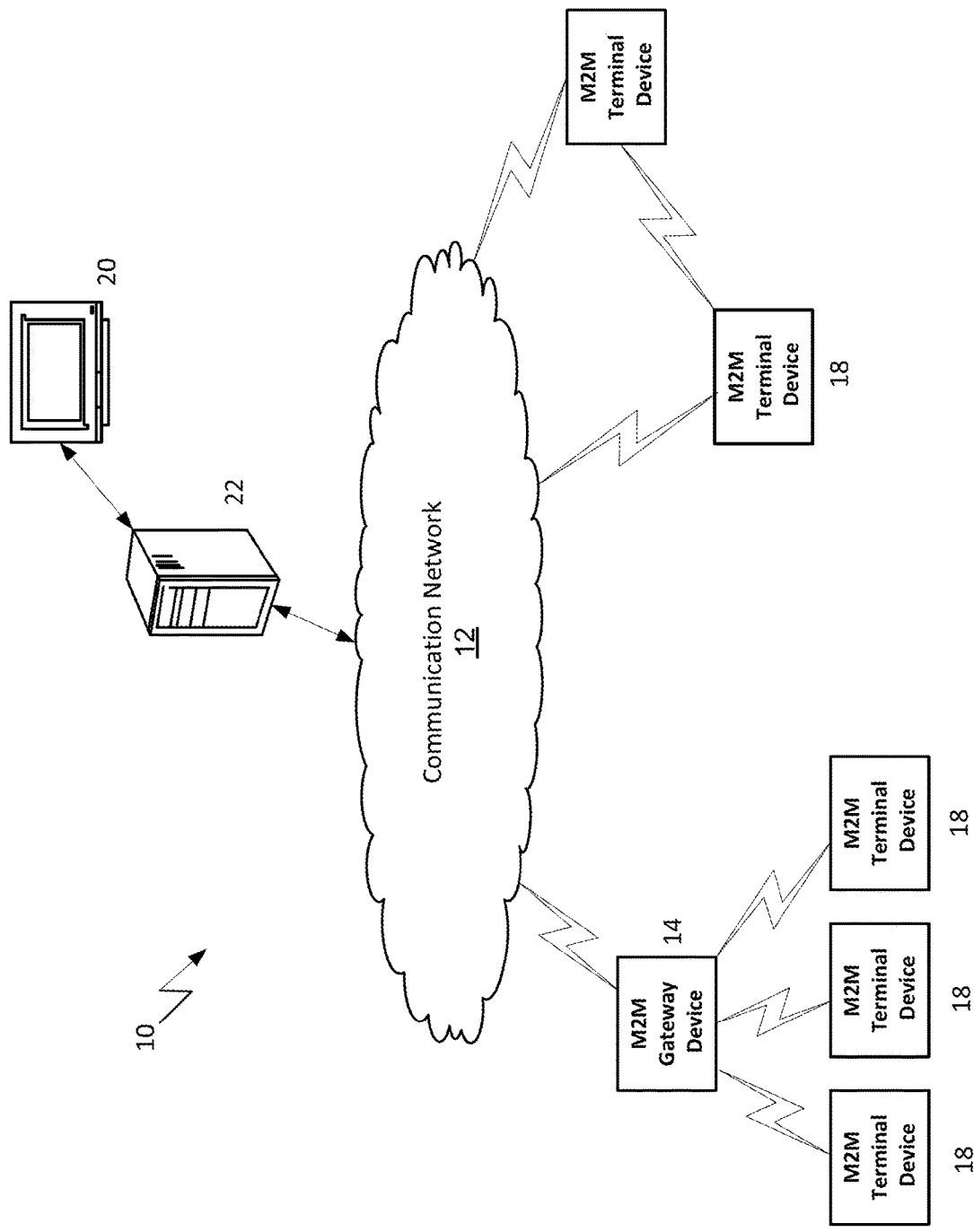
FIG. 12A shows an example system diagram of an example machine-to-machine (M2M) or Internet of Things (IoT) communication system in which one or more disclosed embodiments may be implemented.
Figure 12B:
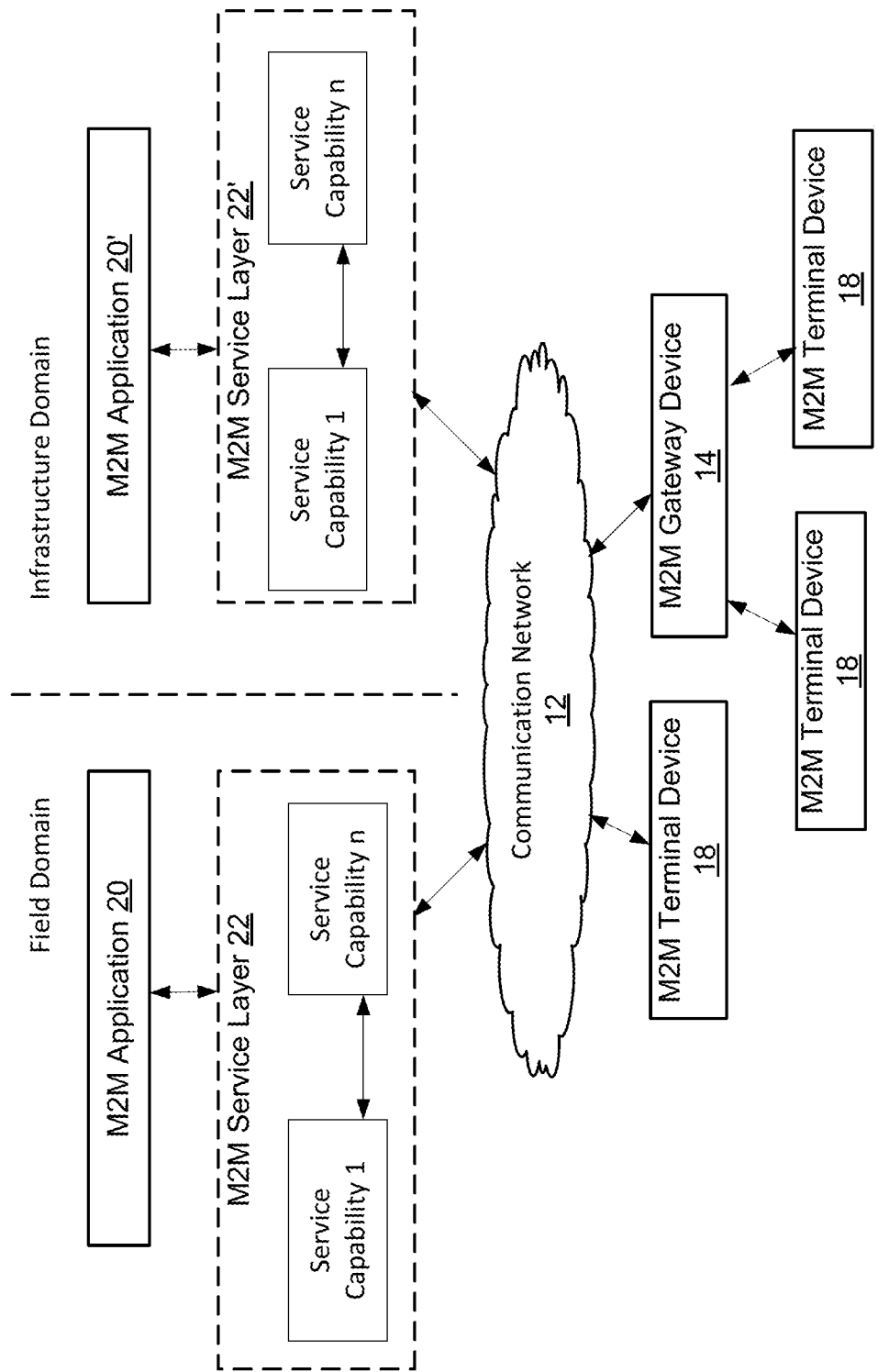
FIG. 12B shows an example system diagram of an example architecture that may be used within the M2M/IoT communications system illustrated in FIG. 12A.
Figure 12C:
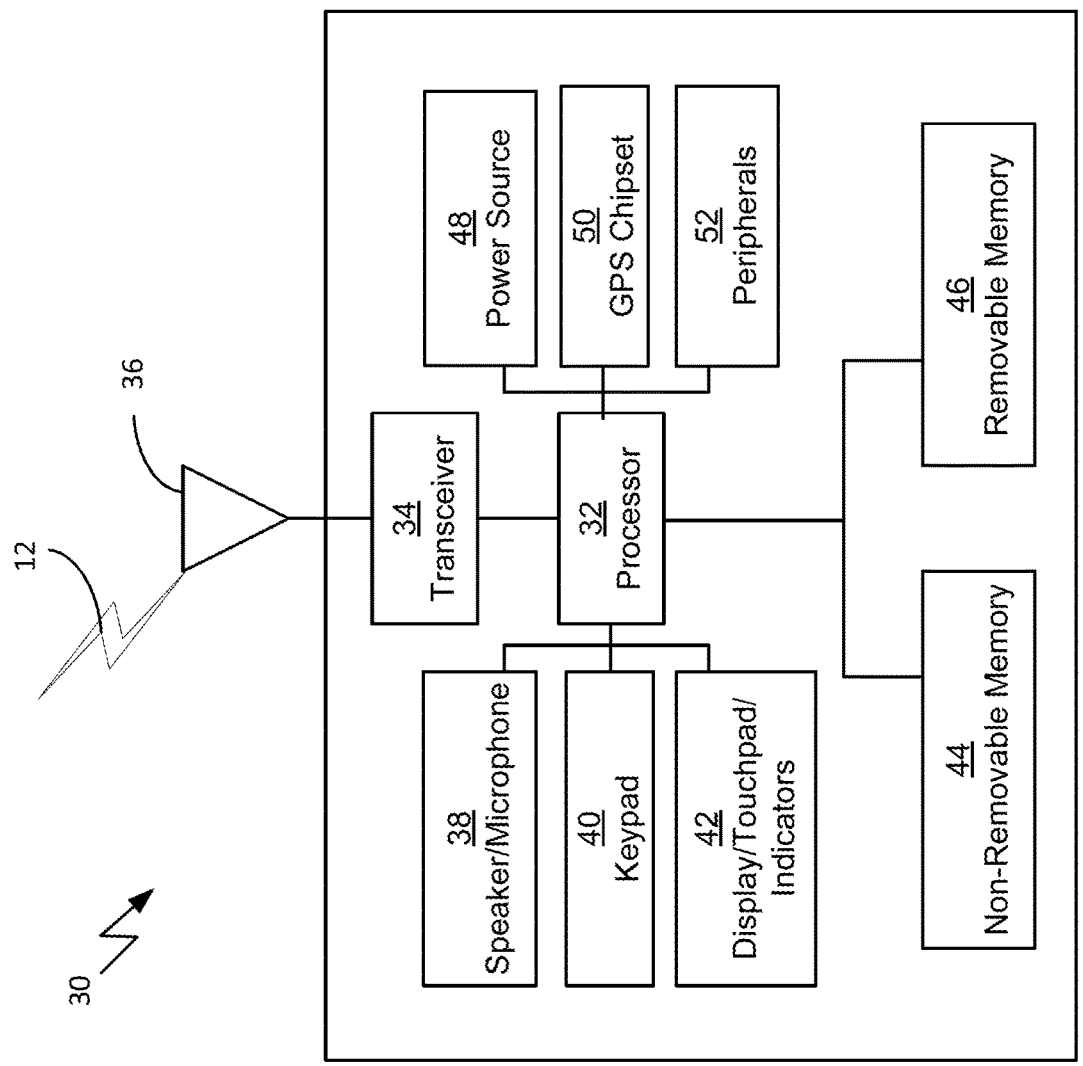
FIG. 12C shows an example system diagram of an example M2M/IoT terminal or gateway device that may be used within the communications system illustrated in FIG. 12A.
Figure 12D:
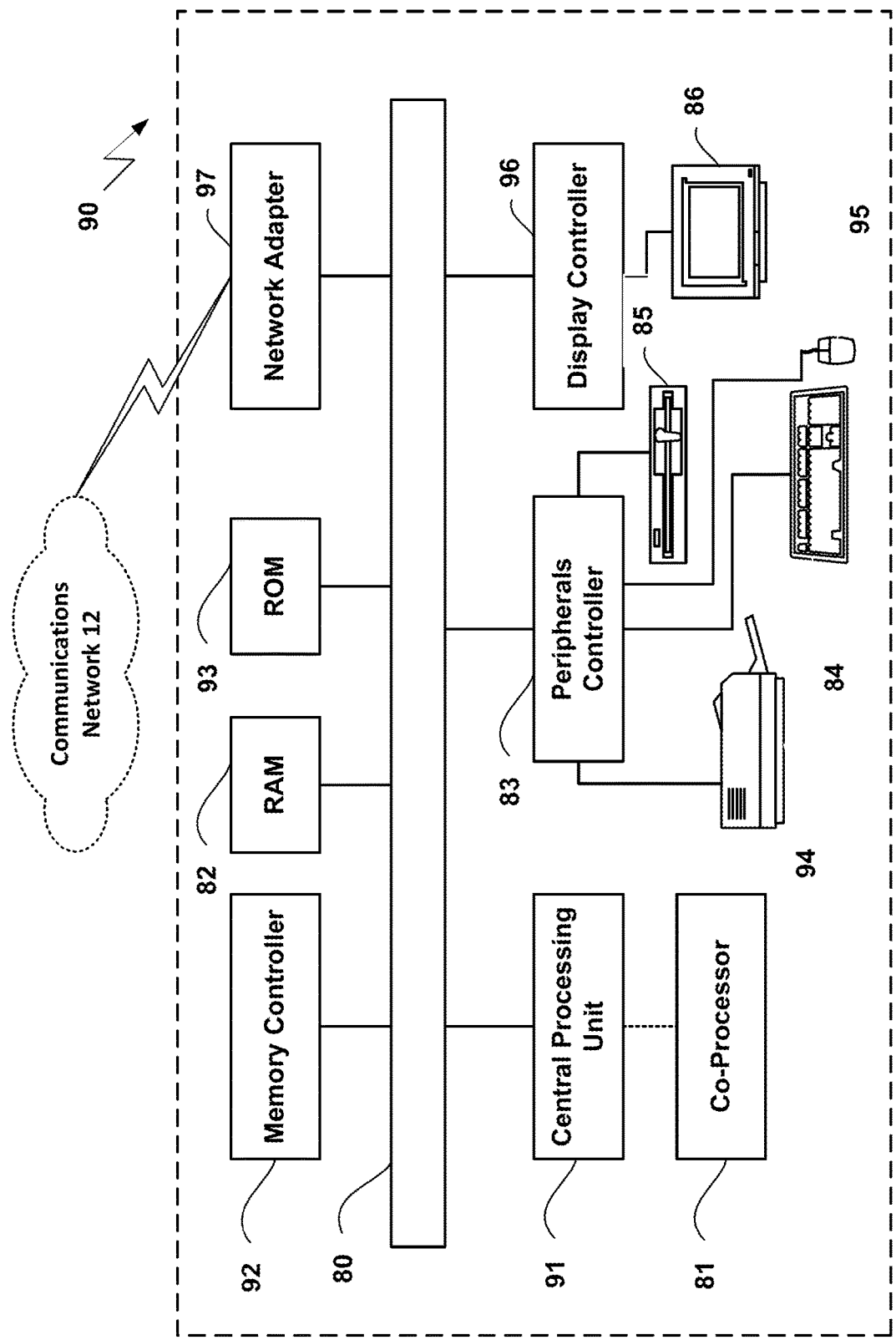
FIG. 12D shows an example block diagram of an example computing system in which aspects of the communication system of FIG. 12A may be embodied.

Any of the entities performing the steps illustrated in FIGS. 9-11, such as the AVS, an AE, a CSE, another SL entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 12C or FIG. 12D. That is, the method(s) illustrated in FIGS. 9-11 may be implemented in the form of software (i.e., computer-executable instructions) stored in a memory of an apparatus, such as the apparatus or computer system illustrated in FIG. 12C or FIG. 12D, which computer executable instructions, when executed by a processor of the apparatus, perform the steps illustrated in FIGS. 9-11. It is also understood that any transmitting and receiving steps illustrated in FIGS. 9-11 may be performed by communication circuitry of the apparatus/entity under control of the processor of the apparatus and the computer-executable instructions (e.g., software) that it executes.

FIG. 12A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 2-7 and 9-11 may comprise a network apparatus of a communication system, such as the ones illustrated in FIGS. 12A-12D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 12B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 12B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 12B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 12C or FIG. 12D described below.

Further, the methods and functionalities described herein may be implemented as part of an M2M network that uses a Service Oriented Architecture (SOA) and/or a Resource-Oriented Architecture (ROA) to access services.

FIG. 12C is a block diagram of an example hardware/software architecture of an apparatus of a network, such as one of the entities illustrated in FIGS. 2-7 and 9-11, which may operate as an M2M server, gateway, device, or other network apparatus in an M2M network such as that illustrated in FIGS. 12A and 12B. As shown in FIG. 12D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the context aware authorization methods described herein, such as the methods operations illustrated and described in relation to FIGS. 2-7 and 9-11.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 12C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 6, 7 and 9-11) and in the claims. While FIG. 12C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 12D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 12C is a block diagram of an example computing system 90 which may also be used to implement one or more network apparatuses of a network, such as the entities illustrated in FIGS. 2-7 and 9-11 and described herein, which may operate as an M2M server, gateway, device, or other network apparatus in an M2M network such as that illustrated in FIGS. 12A and 12B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 12D and its accompanying description.

Further, computing system 90 may contain communication circuitry, such as for example a network adaptor 97, that may be used to connect computing system 90 to an external communications network, such as network 12 of FIG. 12A-12D, to enable the computing system 90 to communicate with other apparatuses of the network. The communication circuitry, alone or in combination with the CPU 91, may be used to perform the transmitting and receiving steps described herein (e.g., in FIGS. 2-7 and 9-11) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

| | |
|---|---|
| acpi | A common attribute of oneM2M resources used to link a resource to the <accessControlPolicy> resources that give registrants authorization to perform operations on the resource. |
| ADN | Application Dedicated Node |
| AE | Application Entity |
| API | Application Programming Interfaces |

-continued

| Terms | Definitions |
| --- | --- |
| ASN | Application Service Node |
| AVS | Authorization Verification Service |
| CAA | Context Aware Authorization |
| CSE | Common Service Entity |
| CSF | Common Service Function |
| IN | Infrastructure Network |
| IoT | Internet of Things |
| IP | Internet Protocol |
| M2M | Machine to Machine |
| MN | Middle Node |
| NoDN | Non-oneM2M Node |
| PoA | Point of Access |
| ROA | Resource Oriented Architecture |
| URI | Uniform Resource Identifier |

The following is a list of terms and definitions relating to service layer technologies that may appear in the above description. Unless otherwise specified, the terms and definitions used herein refer to the corresponding term listed below:

| Terms | Definitions |
| --- | --- |
| M2M/IoT Service Layer | A software middleware layer that supports value-added services for M2M/IoT applications and devices through a set of Application Programming Interfaces (APIs) and underlying networking interfaces. |
| M2M/IoT Application | An application targeting a particular M2M/IoT use case (e.g. eHealth, smart energy, home automation) |
| Service Layer Entity | An M2M/IoT Application or an instance of a M2M/IoT Service Layer |
| Service Layer Resource | A uniquely addressable object hosted by a M2M/IoT Service Layer |
| Service Layer Request | An operation issued by a Service Layer Entity that targets a Service Layer Resource |
| Registrants | Entities registered to or using an IoT/M2M Service Layer (e.g. applications, sensors, devices, other IoT/M2M Service Layers) |
| Metadata | Data that provides information about other data. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method implemented by an authorization verification service of a service layer, the method comprising:
    receiving, from a device, a request to access at least one of data or a service made available by the service layer;
    determining an authorization policy associated with information indicative of prior access attempts for the at least one of the data or service made available by the service layer;
    determining one or more context aware states associated with the authorization policy, wherein the one or more context aware states comprise an indication of a plurality of conditions for accessing the at least one of the data or service made available by the service layer, and wherein the plurality of conditions comprise a number of allowed accesses to the at least one of the data or service made available by the service layer within a defined period of time;
    determining whether the plurality of conditions associated with the one or more context aware states are valid;
    granting, to the device and based on determining that the plurality of conditions associated with the one or more context aware states are valid, access to the at least one of the data or service made available by the service layer;
    determining the defined period of time elapses; and
    resetting the number of allowed accesses, based on the elapsed period of time, to the at least one of the data or service made available by the service layer.

2. The method of claim 1, wherein the one or more conditions associated with the one or more context aware states further comprise a time duration for accessing the at least one of the data or service made available by the service layer.

3. The method of claim 1, wherein the one or more conditions associated with the one or more context aware states further comprise a type of device that is allowed access to the at least one of the data or service made available by the service layer.

4. The method of claim 1, wherein the one or more conditions associated with the one or more context aware states are independent of the device and the request to access the at least one of the data or service made available by the service layer.

5. The method of claim 1, wherein the authorization verification service determines the context aware states based on one or more of data stored by the service layer or operations performed by the service layer.

6. The method of claim 1, wherein the one or more context aware states are stored in the authorization policy.

7. The method of claim 1, further comprising updating, based on granting access to the at least one of the data or service made available by the service layer, the one or more context aware states associated with the authorization policy.

8. An apparatus comprising a processor and a memory, the memory storing computer-executable instructions which, when executed by the processor, implement a service layer of a communications network and cause an authorization verification service of the service layer to perform operations comprising:
    receiving, from a device, a request to access at least one of data or a service made available by the service layer;
    determining an authorization policy associated with information indicative of prior access attempts for the at least one of the data or service made available by the service layer;
    determining one or more context aware states associated with the authorization policy, wherein the one or more context aware states comprise an indication of a plurality of conditions for accessing the at least one of the data or service made available by the service layer, and wherein the plurality of conditions comprise a number of allowed accesses to the at least one of the data or service made available by the service layer within a defined period of time;
    determining whether the plurality of conditions associated with the one or more context aware states are valid;
    granting, to the device and based on determining that the plurality of conditions associated with the one or more context aware states are valid, access to the at least one of the data or service made available by the service layer;

determining the defined period of time elapses; and resetting the number of allowed access, based on the elapsed period of time, to the at least one of the data or service made available by the service layer.

9. The apparatus of claim 8, wherein the one or more conditions associated with the one or more context aware states further comprise a time duration for accessing the at least one of the data or service made available by the service layer.

10. The apparatus of claim 8, wherein the one or more conditions associated with the one or more context aware states further comprise a type of device that is allowed access to the at least one of the data or service made available by the service layer.

11. The apparatus of claim 8, wherein the one or more conditions associated with the one or more context aware states are independent of the device and the request to access the at least one of the data or service made available by the service layer.

12. The apparatus of claim 8, wherein the authorization verification service determines the context aware states based on one or more of data stored by the service layer or operations performed by the service layer.

13. The apparatus of claim 8, wherein the one or more context aware states are stored in the authorization policy.

14. The apparatus of claim 8, wherein the instructions, when executed, further cause the authorization verification service of the service layer to perform operations comprising updating, based on granting access to the at least one of the data or service made available by the service layer, the one or more context aware states associated with the authorization policy.

15. A non-transitory computer-readable storage medium storing computer-executable instructions which, when executed by a processor, cause an authorization verification service of a service layer to perform operations comprising:

receiving, from a device, a request to access at least one of data or a service made available by the service layer;

determining an authorization policy associated information indicative of prior access attempts for with the at least one of the data or service made available by the service layer;

determining one or more context aware states associated with the authorization policy, wherein the one or more context aware states comprise an indication of a plurality of conditions for accessing the at least one of the data or service made available by the service layer, and wherein the plurality of conditions comprise a number of allowed accesses to the at least one of the data or service made available by the service layer within a defined period of time;

determining whether the plurality of conditions associated with the one or more context aware states are valid;

granting, to the device and based on determining that the plurality of conditions associated with the one or more context aware states are valid, access to the at least one of the data or service made available by the service layer;

determining the defined period of time elapses; and resetting the number of allowed accesses, based on the elapsed period of time, to the at least one of the data or service made available by the service layer.

16. The non-transitory computer-readable storage medium of claim 15, wherein the one or more conditions associated with the one or more context aware states further comprise a time duration for accessing the at least one of the data or service made available by the service layer.

17. The non-transitory computer-readable storage medium of claim 15, wherein the one or more conditions associated with the one or more context aware states further comprise a type of device that is allowed access to the at least one of the data or service made available by the service layer.

18. The non-transitory computer-readable storage medium of claim 15, wherein the one or more conditions associated with the one or more context aware states are independent of the device and the request to access the at least one of the data or service made available by the service layer.

19. The non-transitory computer-readable storage medium of claim 15, wherein the authorization verification service determines the context aware states based on one or more of data stored by the service layer or operations performed by the service layer.

20. The non-transitory computer-readable storage medium of claim 15, wherein the one or more context aware states are stored in the authorization policy.

* * * * *